(No Model.)

E. B. RICH.
DEVICE FOR BRAZING SAWS.

No. 433,656. Patented Aug. 5, 1890.

Witnesses:
Celeste P. Chapman.
Jean Elliott

Inventor:
Elisha B. Rich.
By Francis W. Parker
Attorney

UNITED STATES PATENT OFFICE.

ELISHA B. RICH, OF CHICAGO, ILLINOIS.

DEVICE FOR BRAZING SAWS.

SPECIFICATION forming part of Letters Patent No. 433,656, dated August 5, 1890.

Application filed November 7, 1889. Serial No. 329,552. (No model.)

*To all whom it may concern:*

Be it known that I, ELISHA B. RICH, a citizen of the United States, residing at Chicago, county of Cook, and State of Illinois, have invented a certain new and useful Device for Brazing Saws and the Like, of which the following is a specification.

My invention relates to appliances for brazing saws or bringing together the portions of a saw which it is desired to reunite, and this I accomplish by means of the mechanism illustrated in the accompanying drawings, wherein—

Figure 1:
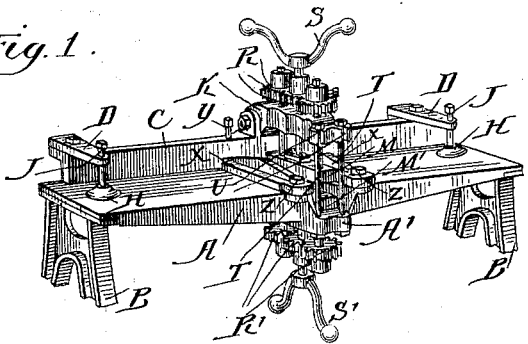
Figure 2:
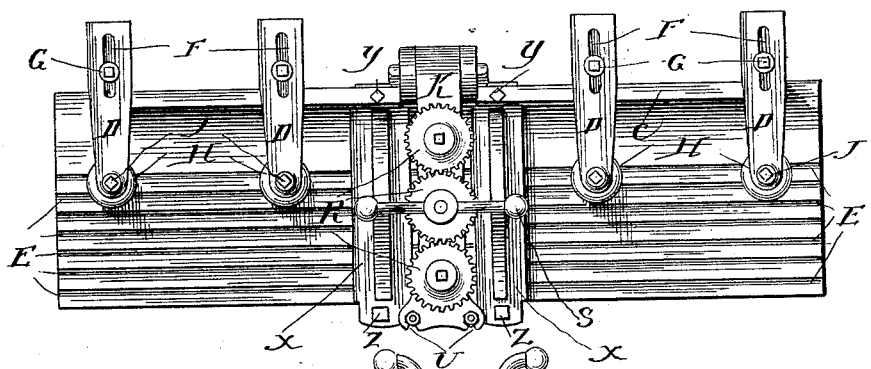
Figure 3:
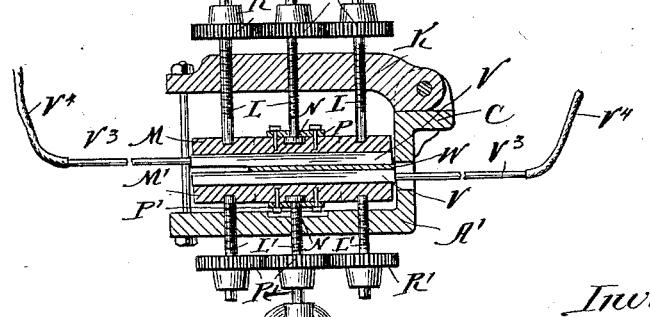
Figure 4:
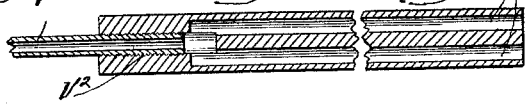

Figure 1 is a perspective view of the device; Fig. 2, a plan view thereof with the brazing-irons removed. Fig. 3 is a cross-section with the brazing-irons removed; Fig. 4, a detail of the brazing-irons.

Like parts are indicated by the same letter in all the figures.

A is a solid table supported on the legs B B, provided with the back board C, from which projects the arms D D and grooved at E E. In Fig. 2 I have shown additional arms D. These arms D are provided with slots F and set-screws G, and carry vertically-adjustable clamp-plates H on the end of the screw-rods J. Hinged to the back board C at its upper middle edge is the plate K, through which pass the screw-rods L L, the outer ones bearing against the block M, and the inner one provided with an enlarged head N, which passes under the plate P, whereby the block M is suspended. The three rods L L carry intermeshing pinions R R and are screw-threaded, the central one in a direction opposite the others.

S is a handle on the center rod. The table A is transversely grooved at its center and terminates in a lower plate A', and on this plate, as on the plate K, are secured parts similar to those last described and indicated each corresponding part by the same letter as just used with the index $l$ affixed thereto. Two bolts T T are secured to the plate A' below and are received into the slots U on the plate K above.

Between the plates M and M' and introduced from the sides are the brazing-irons V V, each provided with the apertures V' V' and $V^2$, the apertures V' V' connected and the aperture $V^2$ screw-threaded to receive the pipe $V^3$, which connects at its outer end with the hose-pipes $V^4$.

W is the saw inserted between such brazing places on opposite sides of the aperture formed between the plates M and M' and the plates X X, which are secured at one end by the set-screws Y Y and at the other by the bolts Z Z.

The use and operation of my invention are as follows: The cross-pieces X X being loosened and the clamp-plates H H freed and brought into proper position, according to the size of the saw to be worked upon, and the plates M and M' being sufficiently separated, all of which is accomplished by properly operating the various bolts and nuts, the two portions of the saw to be brought together are joined beneath the middle of block M, the teeth of the saw lying in the groove E E, there being as many set-screws as may be desired, according to the character of the saw for which the machine is designed. The saw is now clamped into position by bringing down the clamping-plates H H. The saw is further clamped securely in position by tightening the plates X X thereupon. The plate K is now drawn into position, so as to make the screw-rods L L and screw-rods L' L' parallel with each other. In this position a transverse aperture is left across the table surrounded by the plates X X and M and M', through the middle of which passes the saw. The brazing-plates V V are now inserted in this aperture one above and the other below the saw or portions of the saw at the point to be brazed. Such irons are first heated to a high degree. The silver-solder or some other suitable material is of course properly inserted, so as to come between the brazing-irons and the saw. Each of the brazing-irons is connected by hose with a suitable cold-water supply. As soon as the parts are in position, by operating the handle S or S', or both, the plates M and M' are brought slowly but with great power together to clamp the saw and apply the heat of the brazing-irons thereto. As this operation is continued, the solder melts and the saw reaches a degree of heat, after which it is desirable to suddenly cool the same, and this is accomplished by permitting a current of cold water to pass through the hose-pipes $V^4 V^4$, the handles $V^3$ $V^3$, aperture $V^2$, and the apertures $V'$ $V'$ and away. Thus the parts are all suddenly cooled and the saw successfully brazed. The length of time consumed in such operations is to be varied according to the kind of saw to be treated.

The cooling-apertures may be made of any desired shape and size and connected so as to circulate the current of cooling-fluid through the irons in any way.

Having thus described my invention, what I claim, and desire to secure by Letters Patent, is as follows:

1. In a brazing-machine for saws, the combination of two compressing-blocks, two series of forcing screw-rods connected therewith, and two portions of the table, one ridged and the other hinged thereto and carrying each one series of such screw-rods, so that the rods can first be brought in alignment and then the plates reciprocate toward or from each other, as desired, such screw-rods carrying each an intermeshing pinion and one of them a handle, so that by turning the latter the rods all travel in the same direction.

2. In a brazing-machine, a table along which the parts to be brazed are secured, provided with grooves to receive the sides of the teeth.

ELISHA B. RICH.

Witnesses:
FRANCIS W. PARKER,
CELESTE P. CHAPMAN.